United States Patent
Sumida et al.

(10) Patent No.: US 12,172,588 B2
(45) Date of Patent: Dec. 24, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Shintaro Sumida, Mie (JP); Motohiro Yokoi, Mie (JP); Kenta Ito, Mie (JP); Suguru Yasuda, Mie (JP); Tetsuya Nishimura, Mie (JP); Hitomi Harada, Mie (JP); Haruka Nakano, Mie (JP); Ryusuke Kudo, Mie (JP); Hiroki Hirai, Mie (JP); Hidetoshi Ishida, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 43 days.

(21) Appl. No.: 17/610,298

(22) PCT Filed: May 11, 2020

(86) PCT No.: PCT/JP2020/018801
§ 371 (c)(1),
(2) Date: Nov. 10, 2021

(87) PCT Pub. No.: WO2020/241220
PCT Pub. Date: Dec. 3, 2020

(65) Prior Publication Data
US 2022/0212614 A1     Jul. 7, 2022

(30) Foreign Application Priority Data
May 30, 2019    (JP) .................................. 2019-101554

(51) Int. Cl.
*B60R 16/02*     (2006.01)
*H01B 7/04*      (2006.01)
(Continued)

(52) U.S. Cl.
CPC ........... *B60R 16/0215* (2013.01); *H01B 7/04* (2013.01); *H01B 7/0823* (2013.01); *H02G 3/0406* (2013.01)

(58) Field of Classification Search
CPC .......... H01B 7/04; H01B 7/08; H01B 7/0823; H01B 7/0836; H01B 7/0045; B60R 6/0207; B60R 6/0215; H02G 3/0406
See application file for complete search history.

(56) References Cited

U.S. PATENT DOCUMENTS 4,812,135 A * 3/1989 Smith .................... H01R 12/77
                                                    174/117 FF
5,180,890 A * 1/1993 Pendergrass ............. H01B 7/38
                                                    385/103
(Continued)

FOREIGN PATENT DOCUMENTS

CN      101894614     11/2010
CN      107895605     4/2018
(Continued)

OTHER PUBLICATIONS

Japan Office Action issued in Japan Patent Application No. 2019-101554, dated Oct. 11, 2022, together with English translation thereof.

(Continued)

*Primary Examiner* — Paresh Paghadal
(74) *Attorney, Agent, or Firm* — Greenblum & Bernstein, P.L.C.

(57) ABSTRACT

A wiring member includes: a plurality of wire-like transmission members wired in a form including a main wire part (Continued)

and a branch wire part; and a sheet material including a main wire fixing part to which the main wire part is fixed and a branch wire fixing part to which the branch wire part is fixed, wherein the branch wire fixing part is branched from the main wire fixing part, a branch wire support part is provided in the branch wire fixing part, and the branch wire support part extends along a longitudinal direction of the branch wire part, and is formed to have higher rigidity than each of the wire-like transmission members constituting the branch wire part.

7 Claims, 4 Drawing Sheets

(51) Int. Cl.
  *H01B 7/08* (2006.01)
  *H02G 3/04* (2006.01)

(56) References Cited

U.S. PATENT DOCUMENTS

| | | | | |
|---|---|---|---|---|
| 5,895,889 | A | 4/1999 | Uchida et al. | |
| 5,918,365 | A | 7/1999 | Uchida et al. | |
| 6,115,522 | A * | 9/2000 | Tachikura | G02B 6/4404 385/103 |
| 10,867,721 | B2 | 12/2020 | Ishida et al. | |
| 2003/0141099 | A1 | 7/2003 | Tanaka | |
| 2010/0158453 | A1* | 6/2010 | Cody | G02B 6/4433 385/100 |
| 2011/0043032 | A1 | 2/2011 | Suzuki et al. | |
| 2013/0188916 | A1* | 7/2013 | Bradley | G02B 6/4429 385/113 |
| 2013/0256028 | A1* | 10/2013 | Oiwa | B60R 16/0215 174/72 A |
| 2014/0254995 | A1* | 9/2014 | Shoemaker | G02B 6/4404 385/101 |
| 2015/0310964 | A1* | 10/2015 | Larson | G02B 6/4432 385/101 |
| 2019/0217792 | A1 | 7/2019 | Kawaguchi et al. | |

FOREIGN PATENT DOCUMENTS

| | | |
|---|---|---|
| CN | 109154707 | 1/2019 |
| CN | 109313965 | 2/2019 |
| EP | 3451037 | 3/2019 |
| JP | 62-285316 | 12/1987 |
| JP | 08-180743 | 7/1996 |
| JP | 9-35539 | 2/1997 |
| JP | 2002-373529 | 12/2002 |
| JP | 2003-168508 | 6/2003 |
| JP | 2003-223816 | 8/2003 |
| JP | 2004-192949 | 7/2004 |
| JP | 2014-191991 | 10/2014 |
| JP | 2018-137208 | 8/2018 |

OTHER PUBLICATIONS

China Office Action issued in China Patent Application No. 202080038295.5, dated Jul. 7, 2023, together with English translation thereof.
Japan Office Action issued in Japan Patent Application No. 2019-101554, dated Apr. 19, 2022, together with English translation thereof.
China Office Action issued in China Patent Application No. 202080038295.5, dated Nov. 1, 2022, together with English translation thereof.
Japan Office Action issued in Japan Patent Application No. 2023-18844, dated Sep. 26, 2023, together with English translation thereof.
International Search Report issued in International Patent Application No. PCT/JP2020/018801, dated Jun. 23, 2020, along with an English translation thereof.
International Preliminary Report on Patentability issued in International Patent Application No. PCT/JP2020/018801, dated Dec. 9, 2021, along with an English translation thereof.
Office Action (Decision of refusal) issued in Japan Patent Application No. 2023-18844, dated Feb. 13, 2024, together with English translation thereof.
Office Action (Decision of dismissal of amendment) issued in Japan Patent Application No. 2023-18844, dated Feb. 13, 2024, together with English translation thereof.
China Office Action issued in China Patent Application No. 202080038295.5, dated Nov. 30, 2023, together with English translation thereof.
China Office Action issued in China Patent Application No. 202080038295.5, dated Jul. 9, 2024, together with English translation thereof.
Written Decision of Retrial issued in China Patent Application No. 202080038295.5, dated Sep. 12, 2024, together with English translation thereof.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Document

Patent Document 1: Japanese Patent Application Laid-Open No. 2018-137208

SUMMARY

Problem to be Solved by the Invention

Desired is a simplification of an operation of assembling a flat wiring member such as a wire harness describe in Patent Document 1 to a vehicle.

Thus, an object is to provide a wiring member which can be easily assembled to a vehicle with a simple operation.

Means to Solve the Problem

A wiring member includes: a plurality of wire-like transmission members wired in a form including a main wire part and a branch wire part; and a sheet material including a main wire fixing part to which the main wire part is fixed a branch wire fixing part to which the branch wire part is fixed, wherein the branch wire fixing part is branched from the main wire fixing part, a branch wire support part is provided in the branch wire fixing part, and the branch wire support part extends along a longitudinal direction of the branch wire part, and is formed to have higher rigidity than each of the wire-like transmission members constituting the branch wire part.

Effects of the Invention

According to the present disclosure, a wiring member which can be easily assembled to a vehicle with a simple operation can be provided.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: a plurality of wire-like transmission members wired in a form including a main wire part and a branch wire part; and a sheet material including a main wire fixing part to which the main wire part is fixed a branch wire fixing part to which the branch wire part is fixed, wherein the branch wire fixing part is branched from the main wire fixing part, a branch wire support part is provided in the branch wire fixing part, and the branch wire support part extends along a longitudinal direction of the branch wire part, and is formed to have higher rigidity than each of the wire-like transmission members constituting the branch wire part. Accordingly, the branch wire part is supported by the branch wire support part, and when the wiring member is transported from a first operation position to a second operation position, bending of the branch wire part is suppressed. Thus, an operation of assembling the wiring member to the vehicle can be easily performed.

(2) The branch wire support part may be formed to be able to be bended and deformed in association with a plastic deformation between a straight state and a bending state. Accordingly, the wiring member can be formed into an appropriate form at a time of manufacture, transportation, and assembling to the vehicle. For example, the wiring member is manufactured while the branch wire support part is in a straight state, and subsequently, the wiring member is transported while the branch wire support part is in a bending state. Then, the wiring member is assembled to the vehicle while the branch wire support part is in a straight state again after the transportation of the wiring member.

(3) The branch wire support part may be a magnetic body. Accordingly, the wiring member with the branch wire support part can be attracted by a magnet.

(4) The branch wire support part may extend to a position overlapping with the main wire fixing part. Accordingly, bending of the branch wire part in a portion where the branch wire fixing part is branched from the main wire fixing part is suppressed.

(5) It is applicable that at least one main wire support part is provided in the main wire fixing part, and the main wire support part extends along a longitudinal direction of the main wire part, and is formed to have higher rigidity than each of the wire-like transmission members constituting the main wire part. Accordingly, the main wire part in the wiring member is supported by the main wire support member, and when the wiring member is transported from the first operation position to the second operation position, bending of the main wire part is suppressed. Thus, an operation of assembling the wiring member to the vehicle can be easily performed.

(6) The main wire fixing part may include a portion where the plurality of main wire support parts are provided at intervals along the longitudinal direction of the main wire part. Accordingly, the main wire part in the wiring member can be bended at a portion between the main wire support parts.

(7) The branch wire support part may be provided to have contact with the main wire support part. Accordingly, bending of the wiring member between the branch wire support part and the main wire support part is suppressed.

(8) The main wire support part may have higher rigidity than the branch wire support part. Accordingly, the main wire support part can firmly support the main wire part which is heavier than the branch wire part in many cases.

(9) The branch wire support part may include an external branch wire support part provided on an outer side of the plurality of wire-like transmission members each constituting the branch wire part along a parallel direction. Accordingly, an outer side part of the branch wire part along the parallel direction is supported by the external branch wire support part.

(10) The branch wire support part may include an internal branch wire support part provided on a position overlapping with the plurality of wire-like transmission members each constituting the branch wire part or between the plurality of wire-like transmission members. Accordingly, an inner side part of the branch wire part along the parallel direction is supported by the internal branch wire support part.

Details of Embodiment of Present Disclosure

Specific examples of a wiring member of the present disclosure are described hereinafter with reference to the drawings. The present invention is not limited to these examples, but is indicated by claims, and it is intended that meanings equivalent to claims and all modifications within a scope of claims are included.

Embodiment 1

Figure 1:
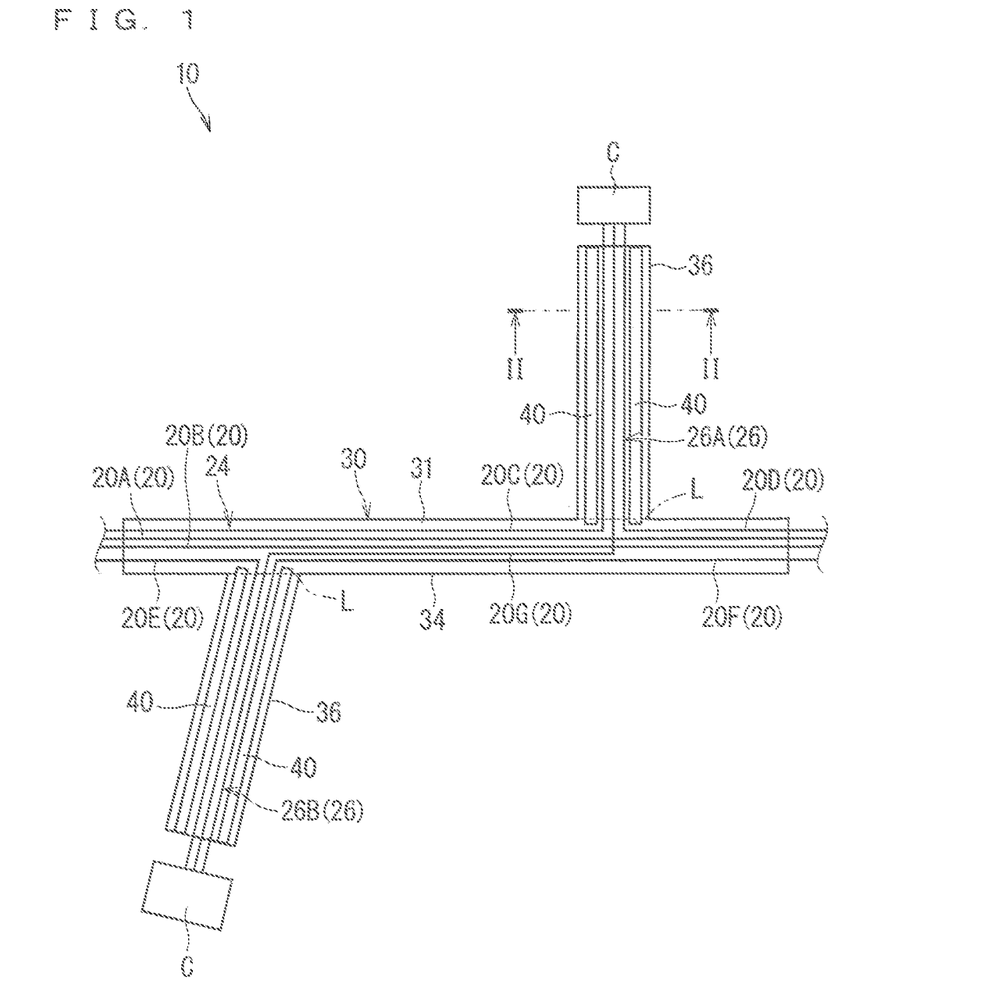
FIG. 1 is a schematic plan view illustrating a wiring member according to an embodiment 1.
Figure 2:
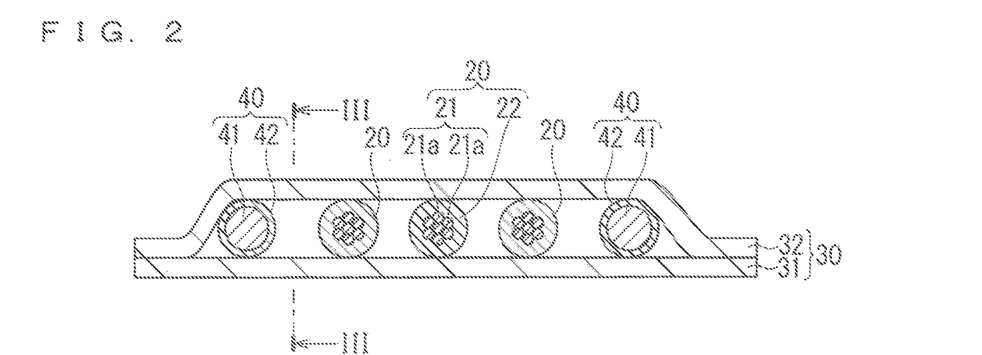
FIG. 2 is a cross-sectional view along a II-II line in FIG. 1.
Figure 3:
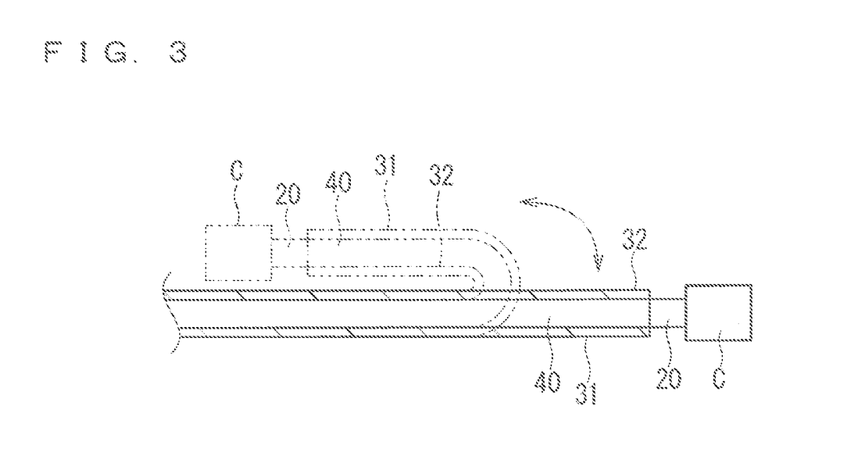
FIG. 3 is a cross-sectional view along a III-III line in FIG. 2.
Figure 4:
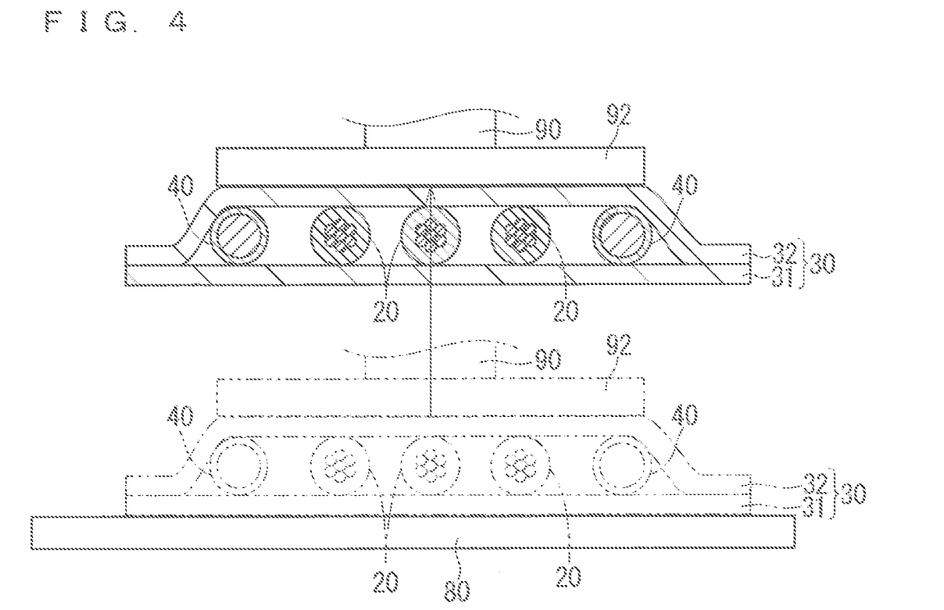
FIG. 4 is an explanation diagram illustrating a state where a wiring member is raised.

A wiring member according to an embodiment 1 is described hereinafter. FIG. 1 is a schematic plan view illustrating a wiring member 10 according to the embodiment 1. FIG. 2 is a cross-sectional view along a II-II line in FIG. 1. FIG. 3 is a cross-sectional view along a III-III line in FIG. 2. FIG. 4 is an explanation illustrating a state where the wiring member 10 is raised.

The wiring member 10 includes a plurality of wire-like transmission members 20 and a sheet material 30. Herein, the wiring member 10 further includes a branch wire support member 40. The branch wire support member 40 is an example of a branch wire support part provided in the wiring member 10. The branch wire support member 40 is an example of a branch wire support part provided separately from the sheet material 30. An example that the branch wire support part is integrated with the sheet material is described hereinafter. A configuration of the branch wire support member provided separately from the sheet material can be applied to the branch wire support part provided integrally with the sheet material so far as consistent with the embodiments.

It is sufficient that the wire-like transmission member 20 is a wire-like member transmitting an electrical power or light, for example. For example, the wire-like transmission member 20 may be a general wire having a core wire 21 and a covering 22 around the core wire 21, or may also be a bare conductive wire, a shielded wire, an enamel wire, a nichrome wire, or an optical fiber.

The wire-like transmission member 20 transmitting the electrical power may be various kinds of signal lines or various kinds of power lines. The wire-like transmission member 20 transmitting the electrical power may be used as an antenna or coil, for example, transmitting or receiving a signal or electrical power to or from a space.

The wire-like transmission member 20 includes a transmission wire body transmitting an electrical power or light and a covering for covering the transmission wire body. When the wire-like transmission member 20 is a general wire, the transmission wire body is a core wire 21, and the covering is an insulating covering 22. The core wire 21 may be made up of a plurality of single wires 21a. The plurality of single wires 21a may be stranded. In the example illustrated in FIG. 2, the plurality of wire-like transmission members 20 having the same diameter and structure are disposed on one sheet material 30, however, it is sufficient that the diameter and the structure of each of the plurality of wire-like transmission members 20 are appropriately set, thus the wire-like transmission members 20 each having a different diameter and a structure, for example, may be disposed on the same sheet material 30.

The wire-like transmission member 20 may be a single wire-like object or a composite object of a plurality of wire-like objects (a twisted wire and a cable made up of a plurality of wire-like objects covered by a sheath). A terminal and a connector C, for example, are appropriately provided in accordance with a connection state of the wire-like transmission member 20 and the other side member in an end portion of the wire-like transmission member 20.

The plurality of wire-like transmission members 20 are wired to have a configuration including a main wire part 24 and a branch wire part 26. The two branch wire parts 26 are provided herein. The two branch wire parts 26 are distinguished as branch wire parts 26A and 26B hereinafter.

The branch wire part 26A is branched from one side portion in the main wire part 24, and the branch wire part 26B is branched from the other side portion in the main wire part 24. The branch wire parts 26A and 26B are branched from positions different from each other along a longitudinal direction of the main wire part 24. A longitudinal direction of the branch wire part 26A is perpendicular to the longitudinal direction of the main wire part 24. A longitudinal direction of the branch wire part 26B is not parallel and perpendicular to the longitudinal direction of the main wire part 24. That is to say, the longitudinal direction of the branch wire part 26B intersects with the longitudinal direction of the main wire part 24 at an angle larger than 0 degree and smaller than 90 degrees. Needless to say, routes of the main wire part 24 and the branch wire part 26 are not limited thereto described above. For example, one branch wire part 26 may be provided, or three or more branch wire parts 26 may also be provided. For example, the two branch wire parts 26 may be branched from one side portion in the main wire part 24. For example, the two branch wire parts 26 may be branched from the same position along the longitudinal direction of the main wire part 24.

In the example illustrated in FIG. 1, the seven wire-like transmission members 20 are disposed on the sheet-like material 30. The seven wire-like transmission members 20 are disposed along predetermined routes, respectively. The seven wire-like transmission members 20 are distinguished as the wire-like transmission members 20A, 20B, 20C, 20D, 20E, 20F, and 20G in some cases hereinafter. Specifically, the wire-like transmission members 20A and 20B are wired to constitute only the main wire part 24 on the sheet material 30. The wire-like transmission members 20C and 20D are wired so that some of them constitutes the main wire part 24 and the other some of them constitutes the branch wire part 26A on the sheet material 30. The wire-like transmission members 20E and 20F are wired so that some of them constitutes the main wire part 24 and the other some of them constitutes the branch wire part 26B on the sheet material 30. The wire-like transmission member 20G is wired so that an intermediate portion thereof constitutes the main wire part 24, one end portion thereof constitutes the branch wire part 26A, and the other end portion thereof constitutes the branch wire part 26B on the sheet material 30.

The wire-like transmission member 20 is fixed to the sheet material 30. The sheet material 30 keeps a wiring state of the wire-like transmission members 20. The sheet material 30 includes a first base material 31 and a second base material 32 herein. The second sheet material 32 is omitted in FIG. 1. The first sheet material 31 covers one side of the wire-like transmission member 20. The second sheet material 32 covers the other side (a side opposite to the first sheet material 31) of the wire-like transmission member 20. An intermediate portion in the wire-like transmission member 20 is surrounded by the first sheet material 31 and the second sheet material 32. Accordingly, suppressed is an exposure of the intermediate portion in the wire-like transmission member 20.

Herein, the wire-like transmission member 20 is fixed to only the first sheet material 31 in the first sheet material 31 and the second sheet material 32. A fixing state of the wire-like transmission member 20 and the first sheet material 31 is not particularly limited, however, bonding or welding may also be applied. The bonding indicates that two members are bonded to each other via an inclusion such as an adhesive agent or a double-sided adhesive tape. The welding indicates that resin contained in at least one of two members are melted and the two members are welded to each other without an intervention of an inclusion. Herein, at least one of resin contained in the covering 22 of the wirelike transmission member 20 and resin contained in the first sheet material 31 is melted and bonded to the other side member, thus the wirelike transmission member 20 and the first sheet material 31 are fixed to each other.

Materials constituting the first sheet member 31 and the second sheet material 32 are not particularly limited, however, the first sheet material 31 and second sheet material 32 are formed of materials containing resin of polyvinyl chloride (PVC), polyethylene terephthalate (PET), polypropylene (PP), or nylon, for example. The first sheet material 31 and the second sheet material 32 may be a fibrous material having fiber such as a non-woven cloth, a woven fabric, or a knitting fabric or a non-fiber material, for example. The non-fiber material may be a solid member with an inner portion evenly filled or a foam made up by foam molded resin. The first sheet material 31 and the second sheet material 32 may contain a material such as metal, for example.

The first sheet material 31 and the second sheet material 32 may be a single layer or may be a plurality of stacked layers. When the first sheet material 31 and the second sheet material 32 are made up of the plurality of stacked layers, it is considered that a resin layer and a resin layer are stacked, for example. It is also considered that a resin layer and a metal layer are stacked, for example. The first sheet material 31 and the second sheet material 32 may be made up of a non-fiber material layer and a non-fiber material layer overlapped with each other, a non-fiber material layer and a fiber material layer overlapped with each other, or a fiber material layer and a fiber material layer overlapped with each other.

The first sheet material 31 has a double-layered structure, for example. A first layer in the first sheet material 31 is a layer appropriate for fixation to the wire-like transmission member 20. For example, the first layer is formed into a solid member, with an inner portion evenly filled, of the same material as that of the covering 22 of the wire-like transmission member 20. The wire-like transmission member 20 is fixed on the first layer. The second layer is a layer enhancing a function of the sheet material 30. The second layer is a non-woven cloth, for example. The first layer may be wholly or partially provided on the second layer 22. For example, the first layer may be provided in the intermediate portion along a width direction of the second layer (a parallel direction of the wire-like transmission member 20), and needs not be provided in a side edge portion. For example, the first layer may be provided at intervals along the longitudinal direction of the second layer (the longitudinal direction of the wire-like transmission member 20).

The second sheet material 32 has a single-layered structure, for example. The second sheet material 32 is formed to have higher rigidity than the first sheet material 31. The second sheet material 32 is formed to be a member of nylon as a material with an inner portion evenly filled, for example. The wire-like transmission member 20 is not fixed to the second sheet material 32. An edge portion of the second sheet material 32 is fixed to the first sheet material 31. A fixing state of the first sheet material 31 and the second sheet material 32 is not particularly limited, however, welding or bonding is also applicable. The second sheet material 32 may be fixed to the first layer or the second layer in the first sheet material 31.

The sheet material 30 includes a main wire fixing part 34 and a branch wire fixing part 36. The main wire fixing part 34 is a part where the main wire part 24 is fixed. The branch wire fixing part 36 is a part where the branch wire part 26 is fixed. The branch wire fixing part 36 is branched from the main wire fixing part 34. That is to say, the branch wire fixing part 36 is connected to the main wire fixing part 34. Herein, the branch wire fixing part 36 is branched from an intermediate portion of the main wire fixing part 34 in a longitudinal direction.

The branch wire support member 40 is formed into a rod-like shape. The branch wire support member 40 extends along a longitudinal direction of the branch wire part 26. A horizontal section of the branch wire support member 40 has a circular shape. A horizontal section of the branch wire support member 40 may have a polygonal shape, for example. The branch wire support member 40 is formed so that the same horizontal section shape is continuously located in the longitudinal direction. The branch wire support member 40 may be formed so that the horizontal section shape is changed at the intermediate portion along the longitudinal direction. The branch wire support member 40 is fixed to the branch wire fixing part 36 at a base end side portion of the branch wire part 26.

The branch wire support member 40 is formed to have higher rigidity than the wire-like transmission member 20 constituting the branch wire part 26. It is sufficient that the branch wire support member 40 has rigidity so as to be able to suppress the branch wire part 26 hanging down in a bending state at a midway portion. It is sufficient that the branch wire support member 40 has rigidity to the extent of moderately bowing toward a tip end side of the branch wire part 26 in a state of supporting the branch wire part 26. In the present example, the two branch wire support members 40 are provided on one branch wire part 26. When the plurality of branch wire support members 40 are provided, it is sufficient that rigidity corresponding to the plurality of branch wire support members 40 is higher than that of the branch wire part 26. Only one branch wire support member 40 may be provided on one branch wire part 26, or three or more branch wire support members 40 may also be provided.

The two branch wire support members 40 are located on an outer side in both sides of the wire-like transmission member 20. In other words, all of the wire-like transmission members 20 are sandwiched by the two branch wire support members 40 in the parallel direction of the wire-like transmission member 20. Accordingly, the branch wire part 26 is hardly twisted. The branch wire support member 40 may be located between the wire-like transmission members 20.

The branch wire support member 40 extends to a position overlapping with the main wire fixing part 34. A line which is an extension line of a side edge portion of the main wire fixing part 34 extending in a band-like shape is defined as a boundary line L between the branch wire fixing part 36 and the main wire fixing part 34. One end of the branch wire support member 40 passes over the boundary line L to reach the main wire fixing part 34. One other end of the branch wire support member 40 reaches a tip end of the branch wire fixing part 36. The branch wire support member 40 extends over the whole length of the branch wire fixing part 36. One other end of the branch wire support member 40 does not pass over the tip end of the branch wire fixing part 36. The other end of the branch wire support member 40 does not reach the connector C, and is not connected to the connector C. The other end of the branch wire support member 40 is not housed in a cavity in a connector housing.

The branch wire support member 40 is formed to be able to be bended and deformed in association with a plastic deformation between a straight state and a bending state (refer to FIG. 3). It is applicable that the bending deformation in association with the plastic deformation can be performed only once or several times. The number of several times may be twice, three times, or more. The branch wire support member 40 is a wire-like member, for example. Herein, the straight state includes a state where the branch wire support member 40 bows in accordance with a self-weight of the wiring member 10. The bending state includes a flexion state. Particularly, the bending state includes a state bending to be folded.

Herein, the branch wire support member 40 includes a core rod 41 and a covering 42. The core rod 41 is formed to have higher rigidity than the wire-like transmission member 20 constituting the branch wire part 26. The core rod 41 is formed to be able to be beaded and deformed in association with a plastic deformation between a straight state and a bending state several times. A material constituting the core rod 41 is not particularly limited, however, the core rod 41 is formed of a material containing metal such as iron, iron alloy, aluminum, aluminum alloy, copper, or copper alloy, for example. For example, the core rod 41 may be formed to be thicker than the single wire 21a in the core wire 21 of the wire-like transmission member 20, or may also be formed to be thicker than the core wire 21 in which the single wires 21a are collected. The covering 42 covers a periphery of the core rod 41. The covering 42 is softer than the core rod 41. A material constituting the covering 42 is not particularly limited, however, the covering 42 is formed of a material containing resin, for example. The covering 42 may be made of the same material as that of the covering 22 of the wire-like transmission member 20.

It is sufficient that the branch wire support member 40 has rigidity capable of supporting the branch wire part 26. A thickness of the branch wire support member 40 is not particularly limited. The thickness of one branch wire support member 40 is preferably the same as or smaller than that of the thickest wire-like transmission member 20 in the wire-like transmission members 20 constituting the branch wire part 26. Accordingly, increase in a thickness of the wiring member 10 in the branch wire part 26 can be suppressed.

The branch wire support member 40 is a magnetic body. Accordingly, as illustrated in FIG. 4, a magnet 92 provided on a tip end of a robot arm 90 attracts the wiring member 10 with the branch wire support member 40 disposed on a table 80. As a result, the wiring member 10 with the branch wire support member 40 can be easily transported. The core rod 41 is a magnetic body herein. For example, when a material of the core rod 41 is stainless steel, the stainless steel may also be a ferrite stainless steel, or martensite stainless steel.

The branch wire support member 40 may be fixed to any of the first sheet material 31 and the second sheet material 32. A fixing state between the branch wire support member 40 and the first sheet material 31 and between the branch wire support member 40 and the second sheet material 32 is not particularly limited, however, welding or bonding is also applicable. The branch wire support member 40 is welded to the first sheet material 31 herein. The covering 42 and the first sheet material 31 are welded to each other.

The branch wire support member 40 is surrounded by the first sheet material 31 and the second sheet material 32. The second sheet material 32 is fixed to the first sheet material 31 on an outer side of the branch wire support member 40. In the parallel direction of the wire-like transmission member 20, a housing space of the branch wire support member 40 is not partitioned from a housing space of the wire-like transmission member 20 but is communicated therewith.

The branch wire support member 40 has the same rigidity along the longitudinal direction herein. The rigidity of the branch wire support member 40 on a base end side of the branch wire part 26 (referred to as the base end side support part hereinafter) may be higher than the rigidity of the branch wire support member 40 on a tip end side of the branch wire part 26 (referred to as the tip end side support part hereinafter). Accordingly, the branch wire support member 40 can firmly support the base end side of the branch wire part 26.

For example, when a thickness, a material, and the number of the base end side support part are different from those of the tip end side support part, the base end side support part may have higher rigidity than the tip end side support part. Specifically, for example, when the thickness of the base end side support part is larger than that of the tip end side support part in a case where a property other than the thickness is the same, the base end side support part may have higher rigidity than the tip end side support part. For example, when the material of the base end side support part has higher rigidity (Young's modulus) than the tip end side support part in a ease where a property other than the material is the same, the base end side support part may have higher rigidity than the tip end side support part. For example, when the number of the base end side support parts parallel to each other is larger than that of the tip end side support part in a case where a property other than the number thereof is the same, the base end side support part may have higher rigidity than the tip end side support part.

Effect Etc. of Embodiment 1

According to the wiring member 10 having the above configuration, the branch wire part 26 is supported by the branch wire support member 40, thus when the wiring member 10 is transported from a first operation position to a second operation position, bending of the branch wire part 26 is suppressed. Thus, an operation of assembling the wiring member 10 to the vehicle can be easily performed.

More specifically, when the wiring member 10 is assembled to the vehicle, the wiring member 10 transported from the first operation position to the second operation position in some cases. At this time, the wiring member 10 disposed on the first operation position is raised and hangs in midair. Then, the wiring member 10 in the hanging state lands on the second operation position. At this time, when the rigidity of the branch wire part is low, the branch wire part is bended at the time of landing on the second operation position, and the form of the wiring member is different from the wiring form in the vehicle in some cases. In contrast, in the wiring member 10 according to the present disclosure, the branch wire part 26 is supported by the branch wire support member 40, thus when the wiring member 10 lands on the second operation position, bending of the branch wire part 26 is suppressed. Thus, when the wiring member 10 lands on the second operation position, the wiring member 10 can keep the wiring form in the vehicle, and an operation can smoothly make a transition to an operation of fixing a terminal portion and an intermediate portion of the wiring member 10 to the vehicle (for example, an operation of connecting the connector C and an operation of fixing a clip). A sequence of operations from the operation of transporting the wiring member 10 to the operation of fixing the terminal portion and the intermediate portion of the wiring member 10 to the vehicle is automatically performed, a fixation error due to the bending of the branch wire part 26 can be suppressed.

The branch wire support member 40 is provided separately from the sheet material 30 as the branch wire support part, thus the branch wire support part can be provided by a member different from the sheet material 30. Accordingly, the branch wire support part can easily have higher rigidity than the sheet material 30. A design of the branch wire can be easily changed.

The branch wire support member 40 is formed to be able to be bended and deformed in association with the plastic deformation between the straight state and the bending state several times, thus the wiring member 10 can have the appropriate form at the time of manufacture, transportation, and assembling to the vehicle. For example, after the wiring member 10 is manufactured while the branch wire support member 40 is in the straight state, the wiring member 10 is transported while the branch wire support member 40 is the bending state. Then, the wiring member 10 is assembled to the vehicle while the branch wire support member 40 is in the straight state again after the transportation of the wiring member 10.

The branch wire support member 40 is the magnetic body, thus the wiring member 10 with the branch wire support member 40 can be attracted by the magnet 92. Accordingly, when the wiring member 10 is transported from the first operation position to the second operation position, the wiring member 10 can be attracted by the magnet 92 and transported.

The branch wire support member 40 extends to the position overlapping with the main wire fixing part 34, thus the bending of the branch wire part 26 is suppressed at the portion where the branch wire fixing part 36 is branched from the main wire fixing part 34.

Embodiment 2

Figure 5:
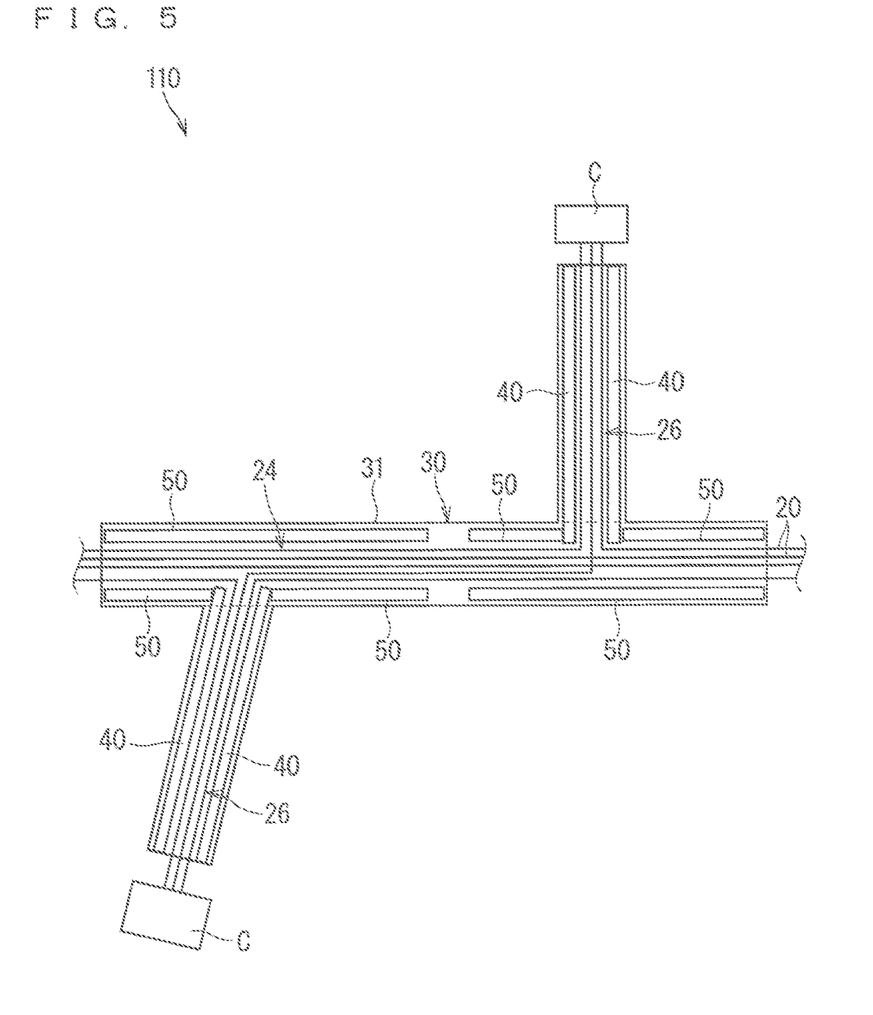
FIG. 5 is a schematic plan view illustrating a wiring member according to an embodiment 2.

A wiring member according to an embodiment 2 is described. FIG. 5 is a schematic plan view illustrating a wiring member 110 according to the embodiment 2. In FIG. 5 the second sheet material 32 is omitted in the manner similar to FIG. 1. In the description of the present embodiment, the same reference numerals are assigned to the similar constituent elements described above, and the description thereof will be omitted.

The wiring member 110 is different from the wiring member 10 in that the wiring member 110 further includes a main wire support member 50. The wiring member 10 described above does not include a support part along the main wire part 24 but includes only the support part along the branch wire part 26. In the meanwhile, the wiring member 110 further includes a support part along the main wire part 24. The main wire support member 50 is an example of a main wire support part provided in the wiring member 10. The main wire support member 50 is an example of a main wire support part provided separately from the sheet material 30. The main wire support part may be integrated with the sheet material. A configuration of the branch wire support member 50 provided separately from the sheet material can be applied to the main wire support part provided integrally with the sheet material so far as consistent with the embodiments.

The main wire support member 50 is formed into a rod-like shape. The main wire support member 50 extends along a longitudinal direction of the main wire part 24. A horizontal section of the main wire support member 50 has a circular shape. A horizontal section of the main wire support member 50 may have a polygonal shape, for example. The main wire support member 50 is formed so that the same horizontal section shape is continuously located in the longitudinal direction. The main wire support member 50 may be formed so that the horizontal section shape is changed at the intermediate portion along the longitudinal direction. The main wire support member 50 is fixed to the main wire fixing part 34.

The main wire support member 50 is formed to have higher rigidity than the wire-like transmission member 20 constituting the main wire part 24. It is sufficient that the main wire support member 50 has rigidity so as to be able to suppress the main wire part 24 hanging down in a bending state at a midway portion. It is sufficient that the main wire support member 50 has rigidity to the extent of moderately bowing toward a tip end side of the main wire part 24 in a state of supporting the main wire part 24. When the plurality of main wire support members 50 are provided, it is sufficient that rigidity corresponding to the plurality of main wire support members 50 is higher than that of the main wire part 24.

The main wire part 24 tends to have more wire-like transmission members 20 than the branch wire part 26. Thus, the main wire part 24 tends to have a larger weight than the branch wire part 26. When the main wire support member 50 and the branch wire support member 40 have rigidity corresponding to the main wire part and the branch wire part 26, respectively, it is sufficient that the main wire support member 50 has higher rigidity than the branch wire support member 40. In this case, excess rigidity of the branch wire support member 40 can be suppressed.

For example, when a thickness, a material, and the number of the main wire support member 50 are different from those of the branch wire support member 40, the main wire support member 50 may have higher rigidity than the branch wire support member 40. Specifically, for example, when the thickness of the main wire support member 50 is larger than that of the branch wire support member 40 in a ease where a property other than the thickness is the same, the main wire support member 50 may have higher rigidity than the branch wire support member 40. For example, when the material of the main wire support member 50 has higher rigidity (Young's modulus) than the branch wire support member 40 in a case where a property other than the material is the same, the main wire support member 50 may have higher rigidity than the branch wire supper member 40. For example, when the number of the main wire support members 50 parallel to each other is larger than that of the branch wire support members 40 parallel to each other in a case where a property other than the number thereof is the same, the main wire support member 50 may have higher rigidity than the branch wire support member 40.

The same type of member as that of the main wire support member 50 may be adopted as the branch wire support member 40. In this case, a common component is used for the main wire support member 50 and the branch wire support member 40, thus the type of the component is reduced.

The main wire support member 50 may be formed to be able to be bended and deformed in association with a plastic deformation between a straight state and a bending state several times in the manner similar to the branch wire support member 40. When the main wire support member 50 has high rigidity, there is a possibility that the main wire support member 50 is hardly bended and deformed in association with the plastic deformation between the straight state and the bending state. In this case, as illustrated in FIG. 5, it is sufficient that a position where the main wire support member 50 is not provided is set in the intermediate portion along the longitudinal direction of the main wire fixing part 34. That is to say, it is sufficient that the main wire fixing part 34 includes a portion where the plurality of main wire support members 50 are provided at intervals along the longitudinal direction of the main wire part 24. Accordingly, the main wire part 24 can be handed at a portion between the plurality of main wire support members 50.

The main wire support member 50 may include a core rod and a covering, or may also include only a core rod. The main wire support member 50 may be or may not be a magnetic body. A core rod and a covering similar to the core rod 41 and the covering 42 can be adopted as the core rod and the covering of the main wire support member 50.

A thickness of the main wire support member 50 is not particularly limited as long as the main wire support member 50 has rigidity capable of supporting the main wire part 24. The thickness of one main wire support member 50 is preferably the same as or smaller than that of the thickest wire-like transmission member 20 in the wire-like transmission members 20 constituting the main wire part 24. Accordingly, increase in the thickness of the wiring member 10 in the main wire part 24 can be suppressed.

The main wire support member 50 may be fixed to any of the first sheet material 31 and the second sheet material 32 in the main wire fixing part 34. Welding or bonding, for example, may be adopted as a fixing state of the main wire support member 50 and the main wire fixing part 34 in the manner similar to that of the branch wire support member 40 and the branch wire fixing part 36. A fixing state of the main wire support member 50 and the main wire fixing part 34 may be the sane as or different from that of the branch wire support member 40 and the branch wire fixing part 36.

The main wire support member 50 is surrounded by the first sheet material 31 and the second sheet material 32. The second sheet material 32 is fixed to the first sheet material 31 on an outer side of the main wire support member 50.

The branch wire support member 40 is provided to have contact with the main wire support member 50. Accordingly, bending of the wiring member 110 between the branch wire support member 40 and the main wire support member 50 is suppressed. It is applicable that an end surface of the branch wire support member 40 is provided to have contact with a side surface of the main wire support member 50 or an end surface of the main wire support member 50 is provided to have contact with a side surface of the branch wire support member 40. The branch wire support member 40 may be provided separately from the main wire support member 50.

Effect Etc. of Embodiment 2

An effect similar to that of the wiring member 10 according to the embodiment 1 can be obtained also by the wiring member 110 having the above configuration.

According to the wiring member 110, the main wire part 24 is supported by the main wire support member 50, thus bending of the main wire part 24 is suppressed when the wiring member 110 is transported from the first operation position to the second operation position. Thus, an operation of assembling the wiring member 110 to the vehicle can be easily performed. Moreover, the main wire part 24 in the wiring member 110 can be bonded at a portion between the main wire support members 50.

The branch wire support member 40 is provided to have contact with the main wire support member 50, thus bending of the wiring member 110 between the branch wire support member 40 and the main wire support member 50 is suppressed.

The main wire part 24 tends to be heavier than the branch wire part 26. Even in this case, the main wire support member 50 is configured to have higher rigidity than the branch wire support member 40, thus the main wire support member 50 can firmly support the main wire part 24.

Modification Example

Figure 6:
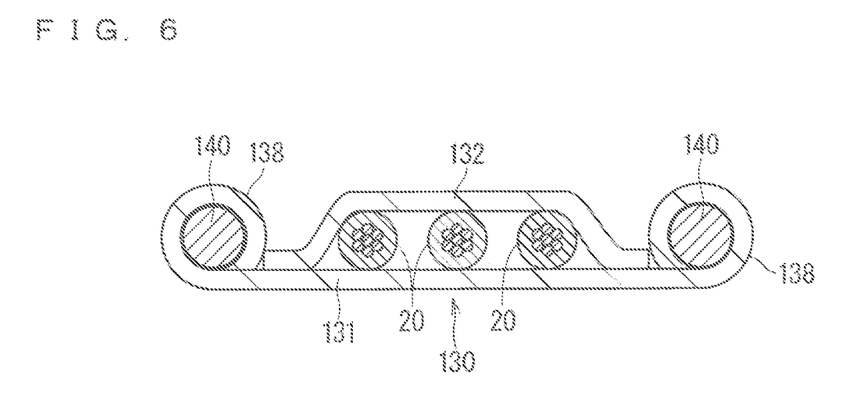
FIG. 6 is a cross-sectional view illustrating a modification example of a fixing state of a branch wire support part and a sheet material.

FIG. 6 is a cross-sectional view illustrating a modification example of a fixing state of a branch wire support part and a sheet material 130. In the example illustrated in FIG. 6, a branch wire support member 140 is surrounded by the first sheet material 131. That is to say, formed in the first sheet material 131 is a surrounding part 138 surrounding the branch wire support member 140 while partitioning the branch wire support member 140 from the wire-like transmission member 20. Accordingly, the branch wire support member 140 is fixed to the branch wire fixing part 36. The surrounding part 138 may be sequentially or intermittently formed over the whole length along the longitudinal direction of the branch wire fixing part 36. The surrounding part 138 may be formed in only one end portion and the other end portion of the branch wire fixing part 36. The surrounding part 138 is formed by an edge portion of the first sheet material 131 in the parallel direction of the wire-like transmission member 20, but may be formed by an intermediate portion of the first sheet material 131. The second sheet material 132 covers the wire-like transmission member 20, but does not cover the branch wire support member 140.

Figure 7:
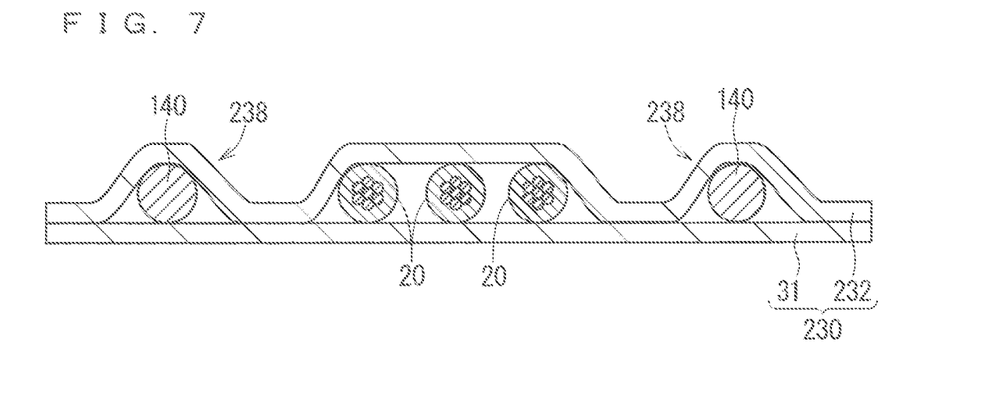
FIG. 7 is a cross-sectional view illustrating another modification example of a fixing state of a branch wire support part and a sheet material.

FIG. 7 is a cross-sectional view illustrating another modification example of a fixing state of a branch wire support part and a sheet material 230. In the example illustrated in FIG. 7, the branch wire support member 140 is surrounded by the first sheet material 31 and a second sheet material 232. The second sheet material 232 is also fixed to the first sheet material 31 between the branch wire support member 140 and the wire-like transmission member 20. In the parallel direction of the wire-like transmission member 20, a housing space of the branch wire support member 140 is partitioned from a housing space of the wire-like transmission member 20. The surrounding part 238 surrounding and partitioning the branch wire support member 140 from the wire-like transmission member 20 is formed by the first sheet material 31 and the second sheet material 232. Accordingly, the main wire support member 140 is fixed to the branch wire fixing part 36. The surrounding part 238 may be sequentially or intermittently formed over the whole length along the longitudinal direction of the branch wire fixing part 36. The surrounding part 238 may be formed only one end portion and the other end portion of the branch wire fixing part 36.

Figure 8:
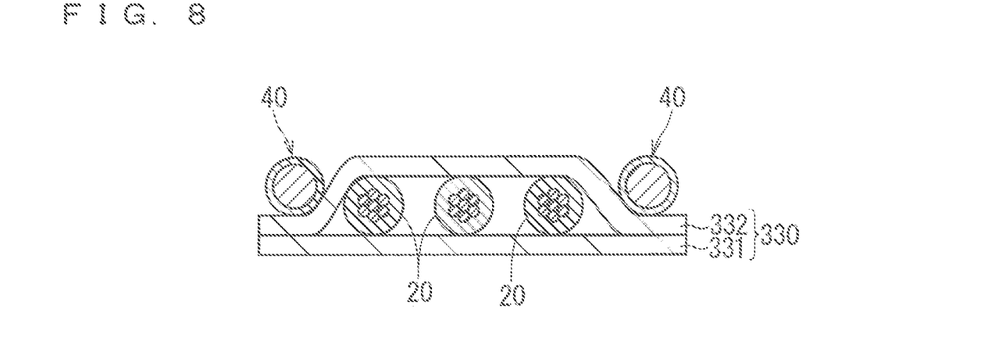
FIG. 8 is a cross-sectional view illustrating another modification example of a fixing state of a branch wire support part and a sheet material.

FIG. 8 is a cross-sectional view illustrating another modification example of fixing state of a branch wire support part and a sheet material 330. In the example illustrated in FIG. 8, the branch wire support member 40 is provided on an outer surface side of a second sheet material 332. The branch wire support member 40 is provided on an outer surface side of a fixing part fixed to the first sheet material 331 in the second sheet material 332. Accordingly, contact of the branch wire support member 40 with the first sheet material 331 is suppressed. The branch wire support member 40 has contact with a flat surface on the outer surface side of the fixing part fixed to the first sheet material 331 in the second sheet material 332. The branch wire support member 40 may also have contact with a curved surface of the second sheet material 332.

The branch wire support member 40 is fixed to the second sheet material 332. A fixing state of the branch wire support member 40 and the second sheet material 332 is not particularly limited, however, welding or bonding is also applicable. It is also applicable that a banding member such as an adhesive tape is wound around the branch wire support member 40 and the sheet material 330 in a state where the branch wire support member 40 and the sheet material 330 have contact with each other to fix the branch wire support member 40 and the second sheet material 332.

The branch wire support member 40 does not preferably protrude to an outer side than a farthest portion of the second sheet material 332 along the thickness direction. The branch wire support member 40 does not preferably protrude to an outer side than an outer edge of the second sheet material 332 along the parallel direction.

The branch wire support member 40 is an example of an external branch wire support part. The external branch wire support part is provided on an outer side of the plurality of wire-like transmission members 20 constituting the branch wire part 26 along the parallel direction. An outer side part of the branch wire part 26 along the parallel direction is supported by the external branch wire support part.

Figure 9:
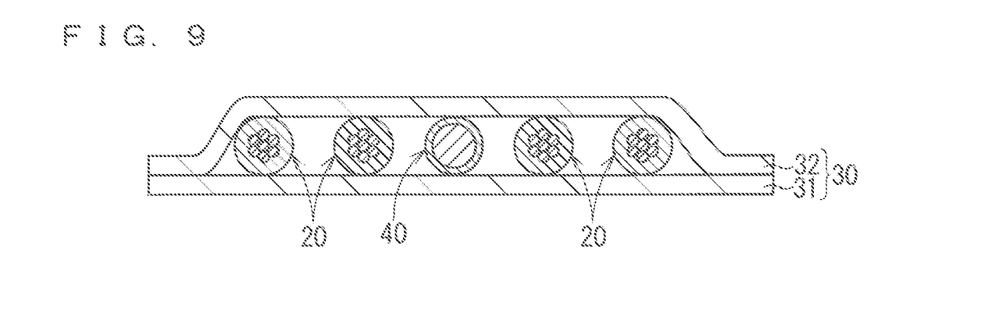
FIG. 9 is a cross-sectional view illustrating another modification example of a fixing state of a branch wire support part and a sheet material.

FIG. 9 is a cross-sectional view illustrating another modification example of a fixing state of the branch wire support part 40 and the sheet material 30. In the example illustrated in FIG. 9, the branch wire support member 40 is provided between the wire-like transmission members 20. The branch wire support member 40 is an example of an internal branch wire support part. The internal branch wire support part is provided in a position overlapping with the plurality of wire-like transmission members 20 constituting the branch wire part 26 or a position between the plurality of wire-like transmission members 20. An inner side part of the branch wire part 26 along the parallel direction is supported by the internal branch wire support part.

The branch wire support member 40 is provided in a center of the wire-like transmission member 20. The branch wire support member 40 may be located in a position other than the center of the plurality of wire-like transmission members 20. For example, when an odd number of the wire-like transmission members 20 are provided, it is sufficient that the branch wire support member 40 is provided adjacent to the wire-like transmission member 20 located in the center. In the example illustrated in FIG. 9, only one branch wire support member 40 is provided between the wire-like transmission members 20, however, several the branch wire support members 40 may be provided.

Figure 10:
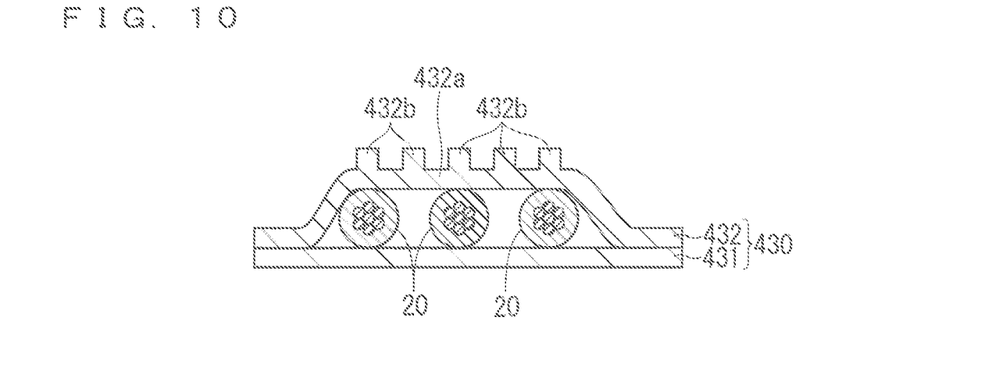
FIG. 10 is a cross-sectional view illustrating another modification example of a fixing state of a branch wire support part and a sheet material.

FIG. 10 is a cross-sectional view illustrating a modification example of a branch wire support part. In the example illustrated in FIG. 10, a sheet material 430 includes a first sheet material 431 and a second sheet material 432. A branch wire support part 432b is provided to be integral with the second sheet material 432. The second sheet material 432 includes a body part 432a and a branch wire support part 432b. The second sheet material 432 is integrally formed into a shape including a body part 432a and a branch wire support part 432b.

The body part 432a is a part extending planarly. The body part 432a includes a part covering the wire-like transmission member 20 and a part fixed to the first sheet material 431.

The branch wire support part 432b protrudes from the body part 432a in a thickness direction. Herein, the branch wire support part 432b protrudes to an outer surface side of the body part 432a. The branch wire support part 432b extends along the longitudinal direction of the wire-like transmission member 20. The plurality of branch wire support parts 432b are formed. The plurality of branch wire support parts 432b are arranged at intervals along a parallel direction. Each branch wire support part 432b has a width dimension smaller than the body part 432a. Each branch wire support part 432b has a width dimension smaller than a part of the body part 432a covering the wire-like transmission member 20. A width dimension of each branch wire support part 432b may be the same as, smaller than, or larger than an outer diameter of the wire-like transmission member 20. When there are a plurality of wire-like transmission members having different outer diameters in one branch wire part, a width dimension of each branch wire support part 432b may be an intermediate dimension between a largest outer diameter and a smallest outer diameter.

The branch wire support part 432b is provided on an outer surface side of a part of the second sheet material 432 covering the wire-like transmission member 20. Each branch wire support part 432b is provided in a position overlapping with the wire-like transmission member 20 or between the wire-like transmission members 20 along a parallel direction. Each branch wire support part 432b is an example of an internal branch wire support part. An inner side of the branch wire part is supported by the internal branch wire support part.

Each branch wire support part 432b may be provided on an outer side of the wire-like transmission member 20 along the parallel direction. That is to say, the branch wire support part 432b may be provided on an outer surface side of a part fixed to the first sheet material 31 in the second sheet material 432. The branch wire support part in this case is an example of the external branch wire support part described above.

A horizontal section of each branch wire support part 432b has a polygonal shape. A corner portion of each branch wire support part 432b may be rounded. A horizontal section of each branch wire support part 432b may have a semicircular shape.

The covering 42 in the branch wire support member 40 is omitted in the branch wire support member 140 illustrated in FIG. 6 and FIG. 7. Accordingly, when the rigidity of the branch wire support members 40 and 140 are substantially the same as each other, the branch wire support member 140 is thinner than the branch wire support member 40 by the thickness of the covering 42. When the thickness of the branch wire support members 40 and 140 are substantially the same as each other, the core rod 41 of the branch wire support member 140 can be thicker than that of the branch wire support member 40, thus the rigidity of the branch wire support member 140 is higher than that of the branch wire support member 40.

A fixing state of the branch wire support member and the sheet material illustrated in FIG. 6 and FIG. 10 may be used for a fixing state of the main wire support member and the sheet material.

In the above description, the branch wire support part is the magnetic body, however, this configuration is not necessary. The branch wire support part may not be the magnetic body.

In the above description, the branch wire support member 40 extends to a position overlapping with the main wire fixing part 34, however, this configuration is not necessary. The branch wire support member 40 may be provided so as not to overlap with the main wire fixing part 34. For example, the branch wire support member may extend to a position of the boundary line L, or may extend to a position in front of the boundary line L.

Exemplified is the configuration that the branch wire support part is provided to range from one side to the other side of the branch wire fixing part 36 in the longitudinal direction, however, it goes without saying that the configuration is not limited thereto. For example, from a viewpoint of fitting the connector C more easily, also applicable is a configuration of partially removing the branch wire support part on a side of the connector C in the longitudinal direction of the branch wire fixing part 36. When the bending is performed in the branch wire fixing part 36 on a side of the main wire fixing part 34 in the longitudinal direction of the branch wire fixing part 36, also applicable is a configuration of partially removing the branch wire support part on the side of the main sire fixing part 34 in the longitudinal direction of the branch wire fixing part 36 from a viewpoint of easily performing the bending.

The configurations described in the embodiments and modification examples thereof can be appropriately combined as long as they are not contradictory. For example, exemplified are the case where the branch wire fixing part is integral with the second sheet material and the case where the branch wire fixing part is formed separately from the second sheet material, however, one of the configuration described in the example of the case of integral formation and the configuration described in the example of the case of separate formation can be appropriately applied to the other configuration.

EXPLANATION OF REFERENCE SIGNS 10, 110 wiring member
20, 20A, 20B, 20C, 20D, 20E, 20F, 20G wire-like transmission member
21 core wire
21a single wire
22 insulating covering
24 main wire part
26, 26A, 26B branch wire part
30, 130, 230, 330, 430 sheet material
31, 131, 331, 431 first sheet material
32, 132, 232, 332, 432 second sheet material
432a body part
432b branch wire support part
34 main wire fixing part
36 branch wire fixing part
138, 238 surrounding part
40, 140 branch wire support member
41 core rod
42 covering
50 main wire support member
80 table
90 robot arm
92 magnet
C connector

The invention claimed is:
1. A wiring member comprising:
a plurality of wire-like transmission members wired in a form including a main wire part and a branch wire part; and
a sheet material including a main wire fixing part to which the main wire part is fixed and a branch wire fixing part to which the branch wire part is fixed, wherein
the branch wire fixing part is branched from the main wire fixing part,
a branch wire support part is provided in the branch wire fixing part,
the branch wire support part extends along a longitudinal direction of the branch wire part, and is formed to have higher rigidity than each of the wire-like transmission members constituting the branch wire part,
at least one main wire support part is provided in the main wire fixing part,
the at least one main wire support part extends along a longitudinal direction of the main wire part, and is formed to have higher rigidity than each of the wire-like transmission members constituting the main wire part,
the at least one main wire support part comprises a plurality of main wire support parts, and
the main wire fixing part includes a portion where the plurality of main wire support parts are provided at intervals in the longitudinal direction of the main wire part.
2. The wiring member according to claim 1, wherein the branch wire support part is formed to be able to be bended and deformed in association with a plastic deformation between a straight state and a bending state.
3. The wiring member according to claim 1, wherein the branch wire support part is a magnetic body.
4. The wiring member according to claim 1, wherein the branch wire support part extends to a position overlapping with the main wire fixing part.

5. The wiring member according to claim 1, wherein
the branch wire support part includes an internal branch wire support part provided on a position overlapping with the plurality of wire-like transmission members each constituting the branch wire part or between the plurality of wire-like transmission members.

6. A wiring member comprising:
a plurality of wire-like transmission members wired in a form including a main wire part and a branch wire part; and
a sheet material including a main wire fixing part to which the main wire part is fixed and a branch wire fixing part to which the branch wire part is fixed, wherein
the branch wire fixing part is branched from the main wire fixing part,
a branch wire support part is provided in the branch wire fixing part,
the branch wire support part extends along a longitudinal direction of the branch wire part, and is formed to have higher rigidity than each of the wire-like transmission members constituting the branch wire part,
at least one main wire support part is provided in the main wire fixing part,
the at least one main wire support part extends along a longitudinal direction of the main wire part, and is formed to have higher rigidity than each of the wire-like transmission members constituting the main wire part,
the branch wire support part is separate from the at least one main wire support part, and
the branch wire support part is provided to have contact with the at least one main wire support part.

7. A wiring member comprising:
a plurality of wire-like transmission members wired in a form including a main wire part and a branch wire part; and
a sheet material including a main wire fixing part to which the main wire part is fixed and a branch wire fixing part to which the branch wire part is fixed, wherein
the branch wire fixing part is branched from the main wire fixing part,
a branch wire support part is provided in the branch wire fixing part,
the branch wire support part extends along a longitudinal direction of the branch wire part, and is formed to have higher rigidity than each of the wire-like transmission members constituting the branch wire part,
at least one main wire support part is provided in the main wire fixing part, and
the at least one main wire support part extends along a longitudinal direction of the main wire part, and is formed to have higher rigidity than each of the wire-like transmission members constituting the main wire part,
the at least one main wire support part is formed to have higher rigidity than the branch wire support part.

* * * * *